June 27, 1967  S. E. JACKE ET AL  3,328,610

SONIC WAVE GENERATOR

Filed July 13, 1964

*INVENTORS*
STANLEY E. JACKE
HENRY BIAGINI
BY
Robert Ames Norton
*ATTORNEY*

United States Patent Office 3,328,610
Patented June 27, 1967

3,328,610
SONIC WAVE GENERATOR
Stanley E. Jacke, Ridgefield, and Henry Biagini, Stamford, Conn., assignors, by mesne assignments, to Branson Instruments, Incorporated, Stamford, Conn., a corporation of Delaware
Filed July 13, 1964, Ser. No. 384,025
10 Claims. (Cl. 310—8.3)

This invention relates to sonics and includes two aspects which may be used entirely independently and unrelated to each other but which are related in that one device may include in its organization both inventions. This application is a continuation-in-part of our co-pending application Ser. No. 125,568, filed July 20, 1961, entitled, Sonic Disperser.

The first invention solves the problem of decoupling sonically vibrating elements from other elements; for example, a case in a hand-held instrument, so that sonic vibrations of any significance are not transferred to said case.

The second invention deals with the solution of two problems in sonic transducers and sonic dispersers in which mixtures of liquid or liquids and solids are dispersed to form suspensions, emulsions, and the like under the influence of sonic vibrations. The first type of invention may be used in an instrument that does not include any of the transducer and disperser inventions of the second aspect. However, all of the inventions may be used in a single sonic dispenser and such a device will be described specifically in connection with the drawings as well as a device which does not include the dispersing and transducer features.

The decoupling part of the present invention produces a desirable result which is self evident after description. However, the inventions dealing with transducers and dispersers require a consideration of the problems encountered in the prior art in order to appreciate the improvements made by the present invention.

Attempts have been made to disperse materials by the use of sonic vibrations, and especially by the use of ultrasonic vibration. A number of problems have arisen, especially with versatile instruments and those which need to be portable or semi-portable. The problems will be brought out in connection with a generalized description of a sonic disperser which will be described as an ultrasonic disperser as this is the most important single field for the present invention, although vibrations in the audible range are included and are sometimes useful.

Essentially dispersers comprise a sonic transducer, which may be of the piezoelectric or magnetostrictive type, coupled with the provision for a zone in which the sonic vibrations are imparted to the liquids or liquids and solids which are to be dispersed. Preferably, in order to increase efficiency, the transducer is provided with a tapering end which acts as a sonic transformer, increasing the magnitude of the vibrations at its narrow end. Two different types of problems arise, both of which are solved by the transducer and disperser aspects of the present invention. The first type of problem deals with the transducer mechanism itself, and the second with the design and the elements of the actual dispersing zone. The first type of problem will first be discussed.

When a transducer operates under widely varying loads a serious problem is presented by heat dissipation and by electrode connection. Both problems are intensified when the load lightens, and hence a larger portion of the input energy is dissipated internally in the form of violent vibrations of the transducer elements, resulting in excessive heat. The problem of actual breakage of the transducer elements, such as for example ceramic piezoelectric wafers for instance of barium titanate or other suitable material, has to a considerable extent been solved in modern piezoelectric transducers where the piezoelectric wafers are bolted between metallic loading elements which greatly strengthens the wafers and makes it less likely for them to break. However, the problem of heat dissipation is still present because if the wafers get too hot and approach or exceed the Curie point they lose their piezoelectric properties. The second problem is that when there is a light load with consequently more extensive movement of the transducer elements electric leads to the electrodes deteriorate rapidly. Most wires cannot be bent repeatedly about a small radius without metal fatigue and rapid breaking. It has thus been a very serious problem to attach the leads to the electrodes in such a form that they will not break off. It is common to locate the electrodes near a node so that the amount of movement in an axial direction is minimized; but even so it cannot be reduced to zero and, at the axial node, radial motion is at a maximum.

The transducer problem is solved by the present invention in a very simple manner. The transducer elements themselves contain light electrodes, such as disks of aluminum, at the nodal point which extend somewhat beyond the transducer elements themselves and their frequency controlling weights. The whole instrument, as is normal, is mounted in a casing. This casing is perforated in the vicinity of the disk electrodes, and they are in turn provided with a large number of holes. At the top of the casing there is provided a fan or other means for inducing a current of air which passes through the holes in the electrodes and, with disks of materials of good heat conductivity such as aluminum, very effective cooling results. At the same time the perforated disk electrodes solve the problem of electric lead breakage. As was mentioned before, lead breakage results from bending about a small radius. In the present invention the end of the wire is solidly fastened by soldering or other means to the disk and then is woven through several perforations in the form of a series of loops. These loops act as strain loops so that there is never any strain on the actual connection of the wire to the electrode where the narrow radius of curvature is situated. As a result very long wire life is obtained and lead breakage is drastically reduced, and in fact may be considered as practically nonexistent. It should be noted that the perforated electrodes are performing these two functions by reason of the same structure. Only a very few of the holes are needed to provide two or three strain loops for the lead and therefore this function does not significantly reduce the cooling effect of the enormously increased surface due to the perforations. At the same time the solution of the heat dissipation and lead problem is effected without any additional moving parts and as the perforated metal disks are extremely cheap to manufacture there is no significant increase in cost.

The disperser described generally above is usually portable or semi-portable and may for certain purposes be hand-held. This means that it is undesirable to impart any considerable amount of sonic vibration, such as ultrasonic vibration, to the case. This can be effected, as will be described in greater detail below, by connecting an axial nodal point of the vibrating mechanism through a thin ring, preferably perforated, as is the case with the perforated electrodes described above, and having a very thin metal edge at its periphery which is fastened to the case through resilient means such as, for example, elastic "O" rings. The perforated electrodes perform the functions of cooling, reducing lead breakage and presenting a relatively thin metal element at or near the nodal point of the sonically vibrating mechanism which can be connected to the outer casing through resilient means which effect practically complete sonic decoupling. Thus in the preferred disperser form both types of invention are involved. However, the sonically vibrating element need not be a transducer, it can be any sonically vibrating element so long as the connection to an outer casing is through a thin solid ring, at or near the nodal point of vibrations, resiliently connected to the outer casing. In such a case, the ring, which may be perforated metal, performs only the decoupling function and not the combined functions of decoupling, cooling and lead protection as in the preferred embodiment of the present invention.

The problems encountered in the zone where the actual dispersion takes place are quite different in their nature from those presented by cooling and lead breakage. In the actual zone of dispersion there are two severe problems and, as they present requirements which are mutually contradictory, compromises have been necessary. It is necessary that there be a very rapid flow of material through the zone where dispersion is taking place because while the first effect of the sonic vibrations is to bring about dispersion, continued exposure of the emulsions or suspensions produced to sonic vibrations proceds to reverse the phenomenon and produce emulsions or dispersions in which the units of the dispersed phase rapidly increase in size. This is just what is not wanted because ordinarily the finer emulsion or suspension is the better its properties. The demulsification which occurs when there is too long an exposure to sonic vibration sometimes goes so far as actually to break emulsions.

The requirement for short dwell time in the sonic vibrating zone is at odds with the requirement that there be sufficient transfer of energy in the form of sonic vibrations. The shorter the dwell time, other things being equal, the smaller the amount of energy to which the medium is exposed. This has necessitated in the past an extremely critical adjustment of zone size, because, of course, the thinner the layer of liquid medium passing across the end of the sonic transformer, the more rapidly the sonic energy is transmitted into the medium. This requirement for very accurately controlled and usually quite thin zones raises another very serious problem, and that is sonic erosion. If the zone is quite thin there will be very serious wear both on the tapered end of the sonic transformer and on the adjacent point on the housing. This has proven quite costly and has a further disadvantage that the relation of zone thickness changes. In the present invention this is solved by providing a very long wearing insert opposite the end of the sonic transformer together with the preferred embodiment of the invention including removable tips for the sonic transformer which may be of different shapes to suit the rheological properties of the media to be dispersed. Also the invention provides for adjusting means, preferably micrometric adjusting means; for changing the zone thickness without disassembly. In this way for a considerable period of time wear can be compensated for until finally the wear inserts have reached the point where they need to be replaced. In the present invention this is done simply, cheaply, and the inserts themselves are of a form which can be manufactured at almost negligible cost.

The present invention, therefore, permits a sonic disperser which can be adjusted to give optimum results over a wide range of materials, and maintain these optimum results, and at the same time presents no problem if the liquid load suddenly changes, as for example if the flow of liquid is interrupted. Even if there is no liquid at all, the instrument does not overheat to the point of damaging itself, and also interruption due to lead breakage is eliminated. The result is an extremely versatile instrument which can be designed to be portable or semi-portable, and which can be rapidly adjusted to meet varying conditions. At the same time this great versatility, protection against overheating, lead breakage, is achieved in a very simple and economical construction which can be manufactured at minimum cost.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

It will be apparent to those skilled in the sonic art that the hand-held transducer assembly, usually provided with a concentrating horn, may be used alone without the disperser attachment for sonically treating solids, liquids, and gases.

The invention will be described in detail in connection with the preferred type of disperser instrument employing a piezoelectric transducer operating in the ultrasonic range, for example from about 20 to 30 kc. The description will also deal with the most versatile modification of the present invention, it being understood that where continuous operation with a uniform material is required, some modification of the completeness and rapidity of adjustment may be made.

The invention will also be described in conjunction with the drawing in which.

Similar reference characters refer to similar parts throughout the several views of the drawing.

Figure 1:
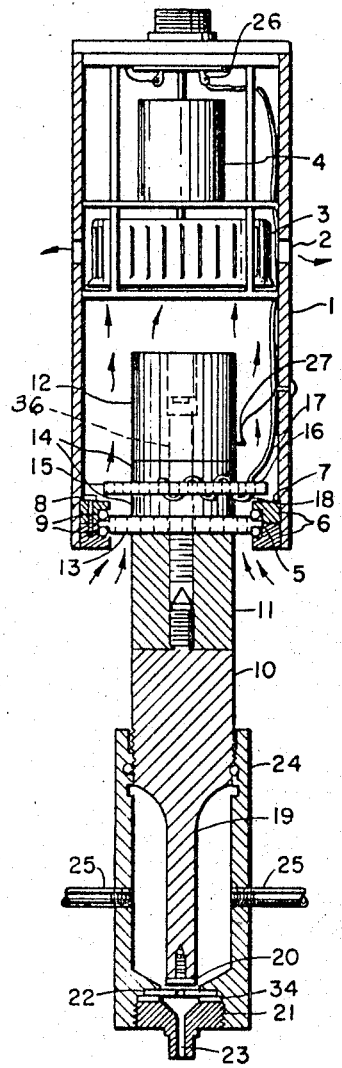
FIG. 1 is a vertical cross-section.

The device shown in FIG. 1 is housed in a two part casing, the upper part of which is shown at 1 and may be of metal. It is provided at a point above the electrodes of the transducer with openings 2 through which cooling air may leave. A blower 3 driven by a motor 4 serves to produce a rapid draft of cooling air in through the bottom of the casing and up through holes in the electrodes as will be described. The bottom part of the casing is provided with a shoulder 7 in which are mounted two metal rings 6 with rubber O rings 9 clamped together with bolts 8. This supports the transducer, as will be described below.

Figure 4:
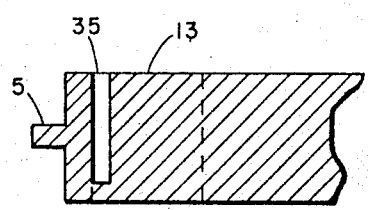
FIG. 4 is a section, partly broken away, on an enlarged scale through part of a perforated electrode.

The transducer is formed of two piezoelectric wafers 14 separated by an aluminum disk electrode 15 provided with holes 16. The other wafer is directly connected to a metallic resonating element or front member 11, and a second perforated aluminum disk 13 constitutes the other electrode. Above the top piezoelectric wafer is another resonating block or back member 12 which may be of different metal than that of the block 11, or which may be of the same material. The blocks and wafers are bolted together by a central bolt 36. As a result, the two metallic resonating blocks and the usual outer silvered surfaces of the two wafers are at the same electrical potential, usually ground. The electrode vent plate 13 provides for additional cooling. The electrode 13, which is situated near the axial nodal point of the transducer, is provided with a thin peripheral edge 5 which is clamped between the O rings and, therefore, supports the transducer on the casing. Thus as the amount of metal in the disk is very small, due to the perforations and to the thin peripheral fin, and primarily due to the poor sonic transmission quantities of the resilient O rings, there is negligible sonic coupling to the casing 1. The coupling may be further reduced by cutting a groove, which is illustrated in FIG. 4, as groove 35.

As has been stated above, cooling air is drawn in the bottom of the casing and passes up through the perforations in the electrodes effecting good cooling. Leads are fastened to one or more of the electrodes, the drawing showing attachment to electrode 15. The lead 17 is rigidly attached, for example, by soldering to the electrode disk. The wire is then looped through several holes forming loose strain loops 18 and is led to one pin from an inlet socket 26. The other pin is connected to the casing and then through a slack wire to a pin 27 on the upper resonating block. This second lead could be connected to the grounded electrode vent plate 13, but the illustrated construction is somewhat simpler and more compact.

The bottom of the sonic transformer 10 tapers into a thin section 19 which increases the amplitude of oscillation of the transducer. The tapered end is preferably threaded and a removable wear element 20 is screwed in. A second casing 24 is screwed onto the large portion 10 of the sonic transformer with extremely fine threads and is provided with side openings 25. The end of the casing carries fine internal threads and a plug 21 screws into it. This plug is provided with a discharge opening 23 leading into a recess in which is mounted a wear insert 22 which is also centrally perforated. The plug bears against a gasket 34 which maintains the casing 24 liquid tight.

In operation liquid or liquids flow in through the inlets 25 and pass in a thin layer between the vibrating tip 20 and the wear insert 22. The spacing is micrometrically adjusted by screwing the casing 24 on the transformer to provide the optimum layer thickness. The dispersion passes out through the discharge hole 23 and as the materials have remained in the zone of violent sonic vibrations only for the time necessary to produce dispersion there is no degradation in the quality of the dispersion. The instrument operates continuously and the dimensions of the zone of dispersion can be maintained constant by an occasional adjustment of the casing 24. Finally, after an extended period of operation which may vary from a number of hours to many days, the insert 22 wears thin, or also the tip 20 may wear to an excessive thinness. When this occurs, the plug 21 is unscrewed, a new insert is introduced, and if necessary a new tip 20. The operation is very rapid, requires no special tools or equipment, and the device is ready to start operation again. Adjustment is then made until the appearance of the dispersion leaving the pipe 23 shows that it is of optimum quality.

The use of a chamber provided by casing 24 constitutes the most practical shape of instrument. However, it should be understood that all that is necessary is that the liquid medium to be dispersed must pass through the sonic zone. It is possible to introduce the medium or a component thereof directly into the sonic transformer employing a hollow tapering portion 19 and a hollow end piece 20. Such a device operates readily and effectively but it is much more expensive and has a further disadvantage where the instrument is to be used with various materials. When the instrument is used first on one material and then on another it is necessary to clean it out. This presents much more of a problem when hollow sonic transformers are used, whereas the casing 24 of the preferred form shown in the drawing can easily be removed and all parts thoroughly and rapidly cleaned.

There must be some means for containing the liquids to be dispersed. However, the containing means does not necessarily have to be integral with the disperser as is the casing 24. The vibrating tip may be used in a separate container.

In FIG. 1 the disperser is shown with a blower to produce a positive draft of cooling air. Where the heat dissipation is considerable, this is desirable to prevent over-heating of the piezoelectric wafers. However, for some instruments the blower may be omitted and the natural flow of air out of an open-top casing may be sufficient. The blower, therefore, is not an essential element of the disperser though a desirable one in the preferred modification.

Figure 2:
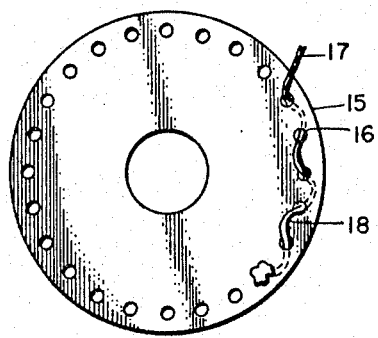
FIG. 2 is a plan view of one of the perforated electrodes.
Figure 3:
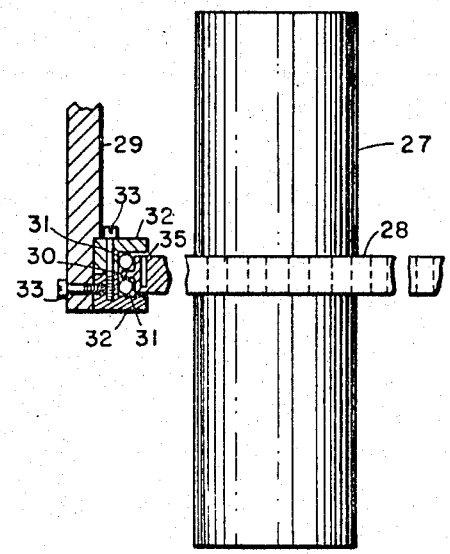
FIG. 3 is a section through a casing and vibrating rod.

FIG. 3 shows sonic decoupling only and is illustated in connection with a sonically vibrating metal rod 27, the sonic vibrations being imparted thereto by any suitable transducer means (not shown). Casing 29 which surrounds the rod 27 is connected thereto through a perforated 28 which is fastened to or near a nodal point on the rod 27. This perforated disk is provided with a thin peripheral fin 30 which is held between two "O" rings 31 and two rings 32 connected to the casing 29 and bolted together by bolts 33. It will be noted that the structure shown is substantially similar to the coupling of the casing 1 in FIGS. 1 and 2, but in FIG. 3 the disk does not perform the additional function of an electrode. Here the perforation is merely to reduce the amount of metal and, therefore, the sonic coupling. The effect is further carried out by the thin fin 30 which actually contacts the resilient "O" rings. The disk is provided with a groove 35 as in the case of the perforated electrode described in connection with FIG. 4. The groove still further reduces the sonic coupling.

As illustrated the connection is through a perforated disk in which there are a number of holes. Of course, there may be only a few large holes which in the extreme would be represented by a spider connecting a thin peripheral ring. The main thing is to reduce the connecting mass of metal, and as there is no cooling function it is immaterial whether the disk has a large surface of metal to be exposed to cooling air. Only the decoupling effect is sought here and this is just as complete as in FIG. 1.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

For example, the transducing elements of the present invention may be comprised of any number of piezoelectric wafers desired in accordance with the teachings of the co-pending application of Stanley E. Jacke, Ser. No. 128,451, filed Aug. 1, 1961 entitled Transducer.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

We claim:
1. A high amplitude sonic transducer comprising, in combination:
 (A) at least one piezoelectric element;
 (B) a vent plate
  (a) located near a node of said transducer,
  (b) formed of material having high heat conductivity,
  (c) in thermal contact with said piezoelectric element, and
  (d) perforated to provide a heat exchanging surface beyond said piezoelectric element; and
 (C) at least two O rings clamped to said vent plate and acoustically isolating said vent plate from a support; and
 (D) fluid moving means for moving a coolant fluid over said heat exchanging surface.

2. A high amplitude sonic transducer for driving acoustical loads of substantially varying impedance, comprising, in combination:
 (A) at least one piezoelectric element;
 (B) resonant frequency determining elements;
 (C) a support element
  (a) located near an axial node of said transducer
  (b) a portion of said support element extending radially beyond said piezoelectric element; and,
 (D) axial clamping means axially clamping said piezoelectric element, said resonant frequency determining elements and said support element together into a unified acoustical unit; and,
 (E) vibration isolating clamping means clamping said radially extending portion of said support element to a relatively fixed support substantially without acoustically loading the same.

3. A high amplitude sonic transducer comprising, in combination:
(A) a pair of piezoelectric disks;
(B) a back member;
(C) a front member;
(D) a generally disk shaped electrode
  (a) sandwiched between said piezoelectric disks,
  (b) extending beyond said piezoelectric disks, and
  (c) provided with a plurality of holes in the portion thereof extending beyond said piezoelectric disks;
(E) a vent plate
  (a) sandwiched between one of said piezoelectric disk and said front member, and
  (b) extending beyond said disk and said front member,
  (c) provided with a plurality of holes in the portion thereof extending beyond said piezoelectric disk and said front member, and
  (d) provided with O-ring seating means about the periphery thereof;
(F) means clamping in axial alignment and in the following order said back member, one of said piezoelectric disks, said electrode, the other of said piezoelectric disks, said vent plate, and said front member together;
(G) a housing for said transducer system comprising
  (a) a generally cylindrical casing in axial alignment with said front member, said piezoelectric disks, said back member, said electrode and said vent plate, and
  (b) O-ring clamping means for clamping at least one O ring to said vent plate, O-ring seating means to support said vent plate in said housing;
(H) a fan
  (a) mounted in said housing above said back member, and
  (b) adapted to move a current of cooling fluid through said vent plate and said electrode and to expel the same from said housing; and
(I) an electrical lead wire
  (a) attached to said electrode, and
  (b) woven through a plurality of the holes therein to provide strain relief to said electrical lead wire.

4. The sonic transducer system defined in claim 3 wherein said vent plate is provided with a pair of opposed O-ring seats; said transducer system further comprises
(J) a pair of O rings; and said clamping means is adapted to clamp said pair of O rings to said opposed O-ring seats in said vent plate.

5. The sonic transducer system defined in claim 3 wherein said vent plate is provided with a thin peripheral portion beyond the holes therein and is supported in said housing by
(J) a pair of rubber O rings clamped thereto by clamping means mounted to said housing.

6. A sonic transducer according to claim 2 wherein there are two piezoelectric elements in the form of wafers, and
(F) a disk electrode sandwiched between said wafers.

7. A sonic transducer according to claim 6 wherein
(a) said electrode is in thermal contact with said wafers and has a heat exchange portion extending peripherally beyond said wafers,
  (1) said heat exchange portion having a large surface to volume ratio.

8. A sonic transducer according to claim 2 wherein the periphery of said support element is formed having a pair of opposed O ring seats, and
(F) a pair of O rings disposed in said seats and engaged by said clamping means.

9. A sonic transducer according to claim 8 wherein said support element is in thermal contact with said piezoelectric element and is perforated adjacent the periphery between said piezoelectric element and said O ring seats to provide a heat exchange surface.

10. The combination of claim 2 including,
(B) a plate-like metallic electrode extending beyond said piezoelectric member and provided with a plurality of holes in the portion thereof extending beyond said piezoelectric element; and
(C) an electrical lead wire
  (a) rigidly attached to said electrode, and
  (b) passing through a plurality of the holes in said electrode to provide strain relieving loops for said electrical lead wire.

References Cited

UNITED STATES PATENTS

| | | | |
|---|---|---|---|
| 1,882,885 | 10/1932 | Polkingham | 310—9.1 |
| 2,266,070 | 12/1941 | Pierce | 310—8.9 |
| 2,323,030 | 6/1943 | Gruetzmacher | 310—9.1 |
| 2,498,737 | 2/1950 | Holden | 310—9.1 |
| 2,512,743 | 6/1950 | Hansell | 310—9.1 |
| 2,831,295 | 4/1958 | Weiss | 310—8.2 |
| 2,916,265 | 12/1959 | Towne | 310—8.3 |
| 2,961,637 | 11/1960 | Camp | 310—8.7 |
| 2,991,594 | 7/1961 | Brown | 51—59 |
| 2,998,535 | 8/1961 | Church | 310—8.3 |
| 3,015,914 | 1/1962 | Roney | 51—59 |
| 3,022,814 | 2/1962 | Bodine | 51—59 |
| 3,140,859 | 7/1964 | Scarpa | 310—9.7 |
| 3,154,890 | 11/1964 | Lemblson | 51—59 |

MAX L. LEVY, *Primary Examiner.*

ORIS L. RADER, *Examiner.*

L. L. SMITH, J. D. MILLER, *Assistant Examiners.*